(12) United States Patent
Su et al.

(10) Patent No.: US 11,784,575 B2
(45) Date of Patent: Oct. 10, 2023

(54) SYNCHRONOUS RECTIFICATION CONTROL CIRCUIT AND METHOD, AND FLYBACK SWITCHED-MODE POWER SUPPLY

(71) Applicant: Joulwatt Technology Co., Ltd., Hangzhou (CN)

(72) Inventors: Zhiyong Su, Hangzhou (CN); Mengyi Huang, Hangzhou (CN)

(73) Assignee: JOULWATT TECHNOLOGY CO., LTD., Hangzhou (CN)

(*) Notice: Subject to any disclaimer, the term of this patent is extended or adjusted under 35 U.S.C. 154(b) by 159 days.

(21) Appl. No.: 17/409,358

(22) Filed: Aug. 23, 2021

(65) Prior Publication Data

US 2022/0166333 A1    May 26, 2022

(30) Foreign Application Priority Data

Nov. 26, 2020  (CN) .......................... 202011355066.4

(51) Int. Cl.
*H02M 3/335*  (2006.01)
(52) U.S. Cl.
CPC ............... *H02M 3/33592* (2013.01)

(58) Field of Classification Search
CPC .................................................. H02M 3/33592
See application file for complete search history.

(56) References Cited

U.S. PATENT DOCUMENTS

| 10,644,604 | B2* | 5/2020 | Wong | H02M 3/33592 |
|---|---|---|---|---|
| 2012/0300520 | A1* | 11/2012 | Ren | H02M 3/33592 363/127 |
| 2021/0006172 | A1* | 1/2021 | Hu | H02M 3/33592 |
| 2022/0376629 | A1* | 11/2022 | Xu | H02M 3/33523 |

* cited by examiner

*Primary Examiner* — Kyle J Moody
(74) *Attorney, Agent, or Firm* — Bayramoglu Law Offices LLC

(57) ABSTRACT

A synchronous rectification control circuit and method, and a flyback switched-mode power supply (SMPS) are provided. A voltage adjustment circuit is used to adjust a value of a first voltage signal that represents an output voltage, such that a voltage-second product of a difference between the output voltage and a drain-source voltage of a secondary-side synchronous rectifier can be zeroed in time in a transient process, and no false accumulation occurs. In this way, when a primary-side transistor switch is turned on, the secondary-side synchronous rectifier is turned off, to avoid a case in which the primary-side transistor switch and the secondary-side synchronous rectifier are simultaneously turned on.

17 Claims, 3 Drawing Sheets

SYNCHRONOUS RECTIFICATION CONTROL CIRCUIT AND METHOD, AND FLYBACK SWITCHED-MODE POWER SUPPLY

CROSS REFERENCES TO THE RELATED APPLICATIONS

This application is based upon and claims priority to Chinese Patent Application No. 202011355066.4, filed on Nov. 26, 2020, the entire contents of which are incorporated herein by reference.

TECHNICAL FIELD

The present disclosure relates to the field of power electronics, and in particular, to a synchronous rectification control circuit and method, and a flyback switched-mode power supply (SMPS).

BACKGROUND

A flyback SMPS topology includes a main power transistor switch, a transformer, and a secondary-side rectifier. The transformer includes a primary winding and a secondary winding. The main power transistor switch is connected to the primary winding, and the secondary-side rectifier is connected to the secondary winding. A synchronous rectifier is typically used as the secondary-side rectifier.

For an active clamp flyback SMPS, a capacitor and an auxiliary transistor switch (labelled as Hi) are connected between a drain of the primary-side main power transistor switch and an input power supply. As shown in FIG. 1, the main power transistor switch is labelled as Li, and the synchronous rectifier is labelled as GT. In discontinuous conduction mode (DCM), a drain-source voltage of the secondary-side synchronous rectifier rings after a follow current is interrupted, referring to a waveform shown in FIG. 2. To avoid mistakenly turning on the secondary-side synchronous rectifier during the ringing, a threshold can be set to distinguish a voltage-second product (S1) of a difference between an output voltage and the drain-source voltage of the secondary-side synchronous rectifier when the primary side is turned on and a voltage-second product (S2) of the difference between the output voltage and the drain-source voltage of the secondary-side synchronous rectifier during the ringing. A proper threshold S is set to meet the following condition: S2<S<S1. In a steady state, the drain-source voltage signal $V_{DS\_S}$ of the synchronous rectifier is generally filtered by a resistor-capacitor (RC) filter circuit, and a filtered voltage $V_{O\_AVG}$ is used as the output voltage $V_O$. To implement soft switching of the primary-side main power transistor switch (Li), the auxiliary transistor switch Hi is usually turned on once more. When the auxiliary transistor switch is turned on based on a Hi signal, the secondary-side synchronous rectifier is turned off simultaneously. Because S>S2, the synchronous rectifier GT is turned off when $V_{DS\_S}$ rings, which can avoid mistakenly turning on the secondary-side synchronous rectifier GT when the auxiliary transistor switch Hi is turned on, and further avoid the breaking-down of the synchronous rectifier caused by the synchronous conduction of the auxiliary transistor switch Hi and the secondary-side synchronous rectifier.

The foregoing active clamp flyback SMPS can normally work in the steady state based on the foregoing settings. However, in a transient process, such as startup, load step (switching from no-load to full-load or full-load to no-load), or output voltage adjustment, because the RC filtered voltage $V_{O\_AVG}$ has a specific delay of usually hundreds of microseconds or several milliseconds, $V_{O\_AVG}$ cannot follow the external output voltage $V_O$ in real time, which fails to meet a condition $V_{DS\_S}<V_{O\_AVG}$ when a ringing amplitude is relatively small. Because the voltage-second product S2 is zeroed when $V_{DS\_S}<V_{O\_AVG}$, the voltage-second product S2 cannot be zeroed at a late stage of the ringing, resulting in constant accumulation of the voltage-second product during the ringing. Within a period from t2 to t3 shown in FIG. 2, the voltage-second product may reach the threshold. If the voltage-second product reaches the threshold, a condition for turning on the secondary-side synchronous rectifier is met. Consequently, the secondary-side synchronous rectifier is turned on when the auxiliary transistor switch Hi is turned on. Due to a limitation of a minimum turn-on time for synchronous rectification, after the auxiliary transistor switch Hi is turned off, the main power transistor switch Li is turned on. Thusly, the main power transistor switch Li and the secondary-side synchronous rectifier may be conducted synchronously, and the secondary-side synchronous rectifier may be broken down.

SUMMARY

In view of this, the present disclosure provides a synchronous rectification control circuit and method, and a flyback SMPS to resolve a problem in the prior art that a main power transistor switch and a secondary-side synchronous rectifier are conducted in a transient process.

The present disclosure provides a synchronous rectification control method, used to control a secondary-side synchronous rectifier of a flyback SMPS and including the following steps:
  detecting a drain-source voltage of the synchronous rectifier to obtain a first voltage signal that represents an output voltage of the SMPS;
  adjusting a voltage value of the first voltage signal to obtain a second voltage signal;
  comparing the drain-source voltage of the synchronous rectifier with the second voltage signal, and when the drain-source voltage of the synchronous rectifier is higher than the second voltage signal, integrating a difference between the drain-source voltage of the synchronous rectifier and the first voltage signal to obtain an integral signal; and when the drain-source voltage of the synchronous rectifier is lower than the second voltage signal, stopping the integration and zeroing the integral signal; and
  setting an integral threshold, wherein the synchronous rectifier is not conducted when the integral signal does not reach the integral threshold.

Preferably, a value of the second voltage signal is set to enable the drain-source voltage of the synchronous rectifier to be lower than the second voltage signal within each resonant period of the drain-source voltage of the synchronous rectifier after the synchronous rectifier is turned off.

Preferably, a comparison result of the integral signal and the integral threshold is labelled as a first comparison signal, and when the integral signal reaches the integral threshold, the first comparison signal is in a first valid state, and the first comparison signal in the first valid state is latched to obtain a first latch result.

Preferably, the drain-source voltage of the synchronous rectifier may be compared with a first voltage threshold to obtain a second comparison signal, and when the drain-source voltage of the synchronous rectifier decreases to the first voltage threshold, the second comparison signal is in a second valid state.

The first latch result is zeroed if the second comparison signal is not in the second valid state within a preset duration after the first comparison signal is latched. The synchronous rectifier is turned on when the first latch result is non-zero and the second comparison signal is in the second valid state.

Preferably, the step of detecting a drain-source voltage of the synchronous rectifier to obtain a first voltage signal that represents an output voltage may specifically include:

sampling the drain-source voltage of the synchronous rectifier to obtain a sampled drain-source voltage signal, and filtering the sampled drain-source voltage signal to obtain an average drain-source voltage of the synchronous rectifier.

The average drain-source voltage of the synchronous rectifier is used as the first voltage signal that represents the output voltage.

Preferably, a value of the first voltage signal may be adjusted to obtain the second voltage signal.

Preferably, at least one reference voltage signal may be set.

If one reference voltage signal is set, a sum of the first voltage signal and the reference voltage signal is used as the second voltage signal.

If a plurality of reference voltage signals are set, the first voltage signal is added to each of the plurality of reference voltage signals to obtain a plurality of intermediate voltage signals, and the largest value among the plurality of intermediate voltage signals is used as the second voltage signal; or one of the plurality of intermediate voltage signals is output as the second voltage signal based on a working status of the SMPS.

Preferably, an adjustment range to the voltage value of the first voltage signal is zero.

The present disclosure further provides a synchronous rectification control circuit, applied to a flyback SMPS. The flyback SMPS includes a primary-side main power transistor switch and a secondary-side synchronous rectifier. The control circuit includes the following circuits:

An output voltage generation circuit is configured to detect a drain-source voltage of the synchronous rectifier to obtain a first voltage signal that represents an output voltage of the SMPS.

A voltage adjustment circuit is configured to receive the first voltage signal and adjust a voltage value of the first voltage signal to obtain a second voltage signal.

A first comparison circuit is configured to compare the drain-source voltage of the synchronous rectifier with the second voltage signal to obtain a first comparison signal.

An integration circuit is configured to receive the drain-source voltage of the synchronous rectifier and the first voltage signal, and determine whether to integrate a difference between the drain-source voltage of the synchronous rectifier and the first voltage signal based on the first comparison signal.

Preferably, a value of the second voltage signal is set to enable the drain-source voltage of the synchronous rectifier to be lower than the second voltage signal within each resonant period of the drain-source voltage of the synchronous rectifier after the synchronous rectifier is turned off.

Preferably, when the drain-source voltage of the synchronous rectifier is higher than the second voltage signal, the integration circuit integrates the difference between the drain-source voltage of the synchronous rectifier and the first voltage signal to obtain an integral signal; and when the drain-source voltage of the synchronous rectifier is lower than the second voltage signal, the integration circuit stops the integration and zeros the integral signal.

Preferably, the control circuit may further include a logic control circuit, configured to:

receive the integral signal output by the integration circuit, set an integral threshold, and when the integral signal does not reach the integral threshold, control the synchronous rectifier to be turned off.

Preferably, when the integral signal reaches the integral threshold, the first comparison signal is in a first valid state, and the first comparison signal in the first valid state is latched to obtain a first latch result.

Preferably, the control circuit may further include a second comparison circuit.

The second comparison circuit compares the drain-source voltage of the synchronous rectifier with a first voltage threshold to obtain a second comparison signal. When the drain-source voltage of the synchronous rectifier decreases to the first voltage threshold, the second comparison signal is in a second valid state.

The logic control circuit zeros the first latch result t if the second comparison signal is not in the second valid state within a preset duration after the first comparison signal is latched. The synchronous rectifier is turned on when the first latch result is non-zero and the second comparison signal is in the second valid state.

Preferably, the output voltage generation circuit may include a sampling circuit and a filter circuit.

The sampling circuit samples the drain-source voltage of the synchronous rectifier to obtain a sampled drain-source voltage signal.

The filter circuit filters the sampled drain-source voltage signal to obtain an average drain-source voltage of the synchronous rectifier. The average drain-source voltage of the synchronous rectifier is used as the first voltage signal that represents the output voltage.

Preferably, the voltage adjustment circuit may include an addition circuit. One reference voltage signal is set. The addition circuit adds the first voltage signal and the reference voltage signal and uses a sum as the second voltage signal.

Preferably, the voltage adjustment circuit may include an addition circuit and a signal selection circuit.

A plurality of reference voltage signals are set. The addition circuit adds the first voltage signal to each of the plurality of reference voltage signals to obtain a plurality of intermediate voltage signals.

The signal selection circuit selects the largest value among the plurality of intermediate voltage signals as the second voltage signal; or outputs one of the plurality of intermediate voltage signals as the second voltage signal based on a working status of the SMPS.

Preferably, an adjustment range to the voltage value of the first voltage signal is zero.

The present disclosure further provides a flyback SMPS, including a primary-side main power transistor switch and a secondary-side synchronous rectifier, and further including the foregoing synchronous rectification control circuit. The synchronous rectification control circuit is configured to control a working status of the secondary-side synchronous rectifier.

In the control circuit solution of the present disclosure, the voltage adjustment circuit is used to adjust the value of the first voltage signal that represents the output voltage, such that a voltage-second product of the difference between the output voltage and the drain-source voltage of the secondary-side synchronous rectifier can be zeroed during ringing in a transient process, and no accumulation occurs. In this way, when the primary-side transistor switch is turned on, the secondary-side synchronous rectifier is turned off, to avoid a case in which the primary-side transistor switch and the secondary-side synchronous rectifier are simultaneously turned on.

DETAILED DESCRIPTION OF THE EMBODIMENTS

The preferred embodiments of the present disclosure will be described in detail below with reference to the accompanying drawings. However, the present disclosure is not limited to these embodiments. The present disclosure covers any replacement, modification, and equivalent methods and solutions made within the spirit and scope of the present disclosure.

To enable the public to have a thorough understanding of the present disclosure, specific details are described in the following preferred embodiments of the present disclosure, and persons skilled in the art can fully understand the present disclosure without the description of these details.

The following describes the present disclosure in more detail by using examples and with reference to the accompanying drawings. It should be noted that the accompanying drawings all adopt very simplified forms and all use imprecise ratios, which are used only for the purpose of conveniently and clearly assisting in describing the embodiments of the present disclosure.

Figure 1:
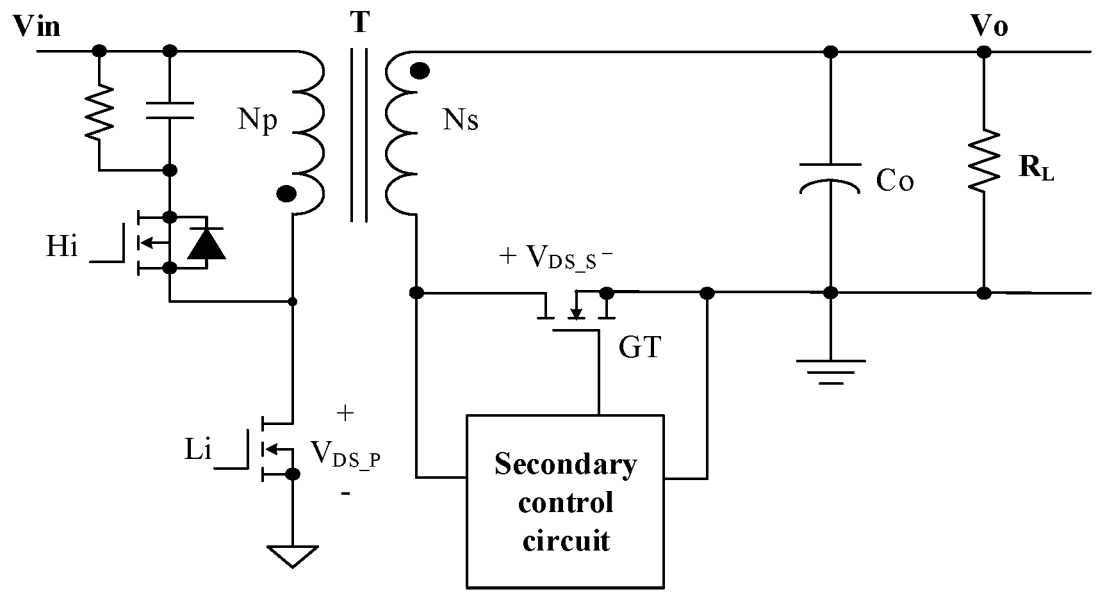
FIG. 1 is a circuit block diagram of an existing active clamp flyback SMPS in prior art.
Figure 2:
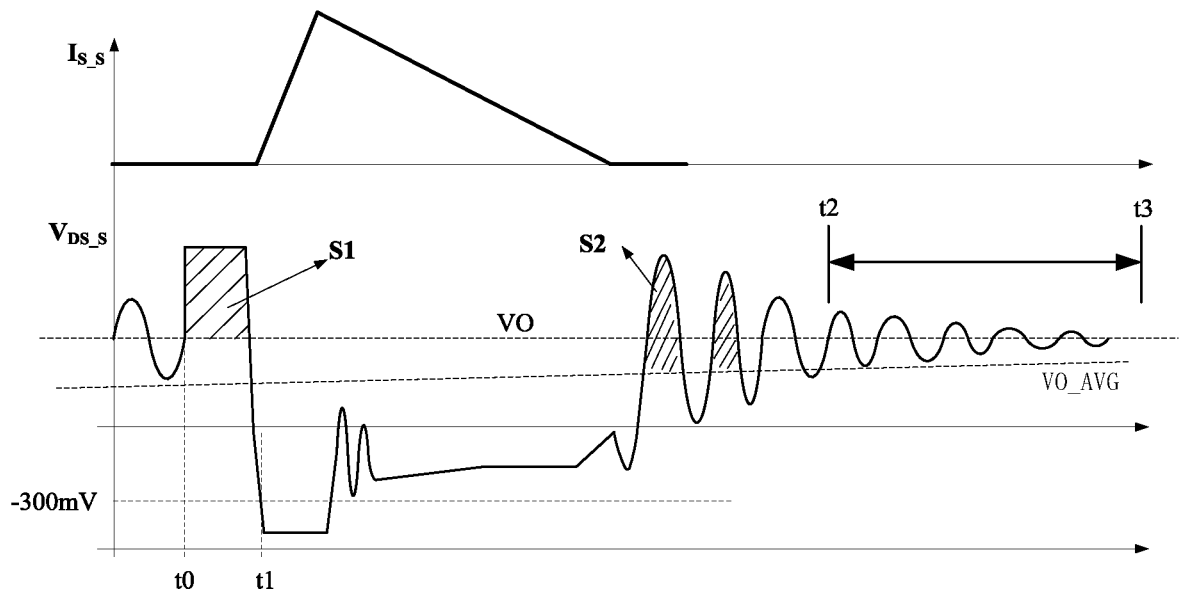
FIG. 2 is a working waveform based on the circuit block diagram in FIG. 1.
Figure 3:
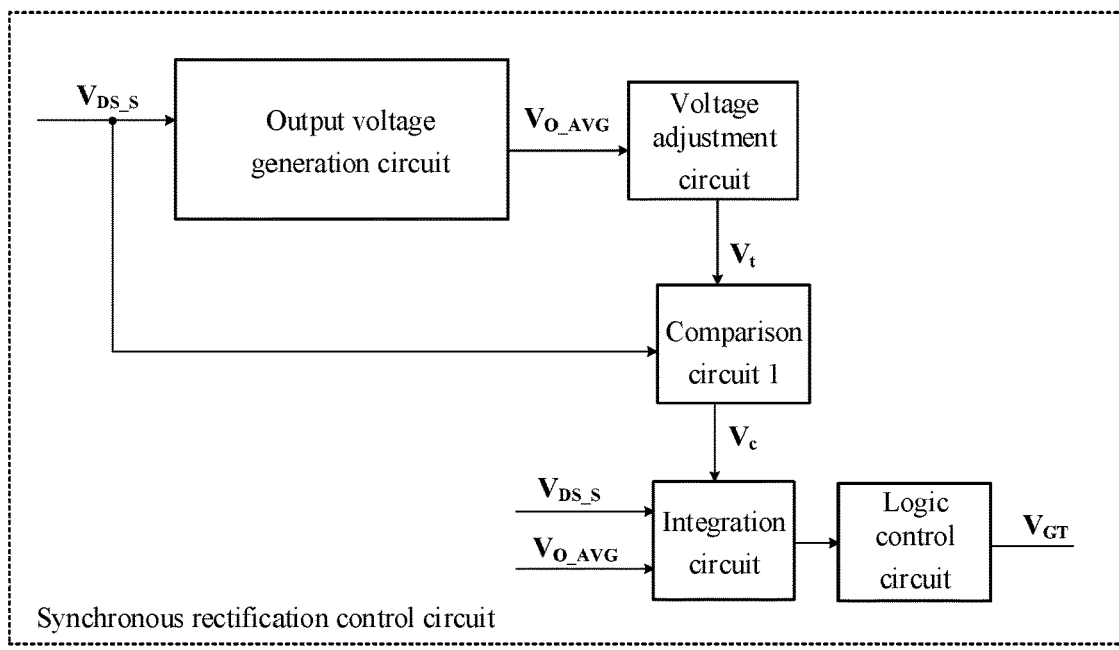
FIG. 3 is a block diagram of a synchronous rectification control circuit according to an embodiment of the present disclosure.
Figure 4:
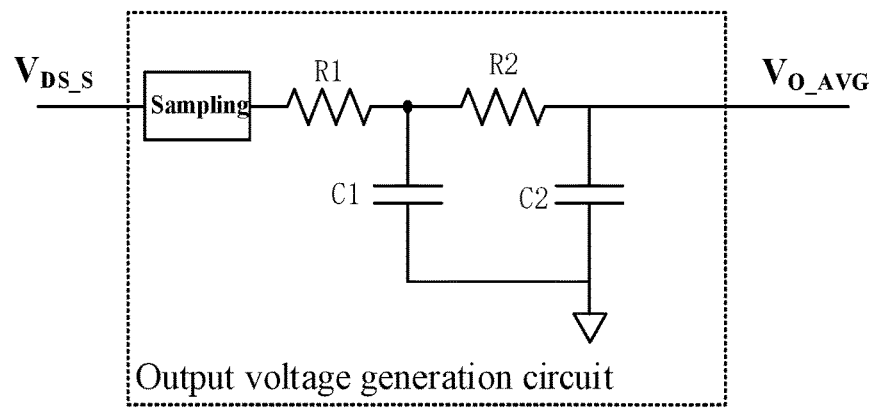
FIG. 4 is a circuit diagram of an output voltage generation circuit in FIG. 3 according to an embodiment of the present disclosure.

The embodiments of the present disclosure provide a synchronous rectification control method. The control method in the present disclosure will be described below with reference to circuit diagrams in FIG. 3, FIG. 4, and FIG. 5. The control method is used to control a secondary-side synchronous rectifier of a flyback SMPS. The control method includes step 1: Detecting a drain-source voltage of the synchronous rectifier to obtain a first voltage signal that represents an output voltage of the SMPS. Referring to FIG. 4, an output voltage generation circuit includes a sampling circuit and a filter circuit. The filter circuit may include resistors and capacitors shown in FIG. 4. The sampling circuit samples the drain-source voltage of the synchronous rectifier. The filter circuit filters the sampled drain-source voltage signal $V_{DS\_S}$ to obtain an average drain-source voltage $V_{O\_AVG}$ of the synchronous rectifier. The average drain-source voltage of the synchronous rectifier is used as a first voltage signal $V_{O\_AVG}$ that represents the output voltage.

Figure 5:
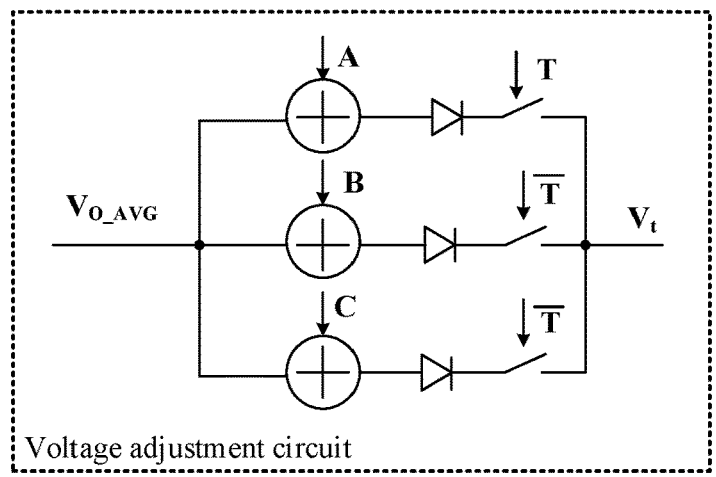
FIG. 5 is a circuit diagram of a voltage adjustment circuit in FIG. 3 according to an embodiment of the present disclosure.

Next, the control method includes step 2: Adjusting a voltage value of the first voltage signal $V_{O\_AVG}$ to obtain a second voltage signal Vt. Specifically, in an embodiment, the value of the first voltage signal may be increased to obtain the second voltage signal. Specifically, at least one reference voltage signal may be set, and the first voltage signal and the at least one reference voltage signal may be calculated to obtain the second voltage signal. If one reference voltage signal is set, a sum of the first voltage signal and the reference voltage signal is used as the second voltage signal. If a plurality of reference voltage signals are set, the first voltage signal is added to each of the plurality of reference voltage signals to obtain a plurality of intermediate voltage signals, and the largest value among the plurality of intermediate voltage signals is used as the second voltage signal. Alternatively, one of the plurality of intermediate voltage signals is output as the second voltage signal based on a working status of the SMPS. FIG. 5 is a circuit diagram of a voltage adjustment circuit according to an embodiment of the present disclosure. A, B, and C are reference voltage signals with different values. A plurality of intermediate voltage signals are obtained by adding each reference voltage signal and the first voltage signal. The plurality of intermediate voltage signals are filtered by a diode to obtain the largest value. Alternatively, the plurality of intermediate voltage signals are filtered by a transistor switch, a switching signal T or T of which is related to the working status of the SMPS. For example, when the SMPS is being started, a transistor switch corresponding to A is allowed to be turned on, such that a signal that is obtained by adding A and the first voltage signal together is used as the second voltage signal. When the SMPS is performing dynamic output, a transistor switch corresponding to B is allowed to be turned on. When the SMPS is adjusting the output voltage, a transistor switch corresponding to C is allowed to be turned on. Through control of a plurality of selection circuits, the second voltage signal is adaptively adjusted based on the working status of the power supply, and one circuit can be adapted to different scenarios.

Then, the control method includes step 3: Comparing the drain-source voltage of the synchronous rectifier with the second voltage signal, and when the drain-source voltage of the synchronous rectifier is higher than the second voltage signal, integrating a difference between the drain-source voltage of the synchronous rectifier and the first voltage signal to obtain an integral signal; and when the drain-source voltage of the synchronous rectifier is lower than the second voltage signal, stopping the integration and zeroing the integral signal. As shown in FIG. 3, a first comparison circuit 1 is configured to compare the drain-source voltage of the synchronous rectifier with the second voltage signal. The first comparison circuit may be implemented by a comparator or the like. An integration circuit is a voltage-second integration circuit, and may be implemented by a circuit that can implement voltage-second integration in the prior art.

The control method further includes the following step: Setting an integral threshold, wherein the synchronous rectifier is not conducted when the integral signal does not reach the integral threshold. In other words, that the integral signal reaches the integral threshold is one of the necessary conditions for turning on the synchronous rectifier.

In an embodiment, a value of the second voltage signal is set to enable the drain-source voltage of the synchronous rectifier to be lower than the second voltage signal within each resonant period of the drain-source voltage of the synchronous rectifier after the synchronous rectifier is turned off. After the synchronous rectifier is turned off, the drain-source voltage of the synchronous rectifier is in a ringing state. As described in the background part, in the prior art, the drain-source voltage of the synchronous rectifier cannot touch the first voltage signal at a late stage of the ringing. In the present disclosure, by increasing the value of the first voltage signal, the drain-source voltage of the synchronous rectifier is enabled to touch the second voltage signal at the late stage of the ringing, such that the integral signal can be zeroed in time without accumulation.

Figure 6:
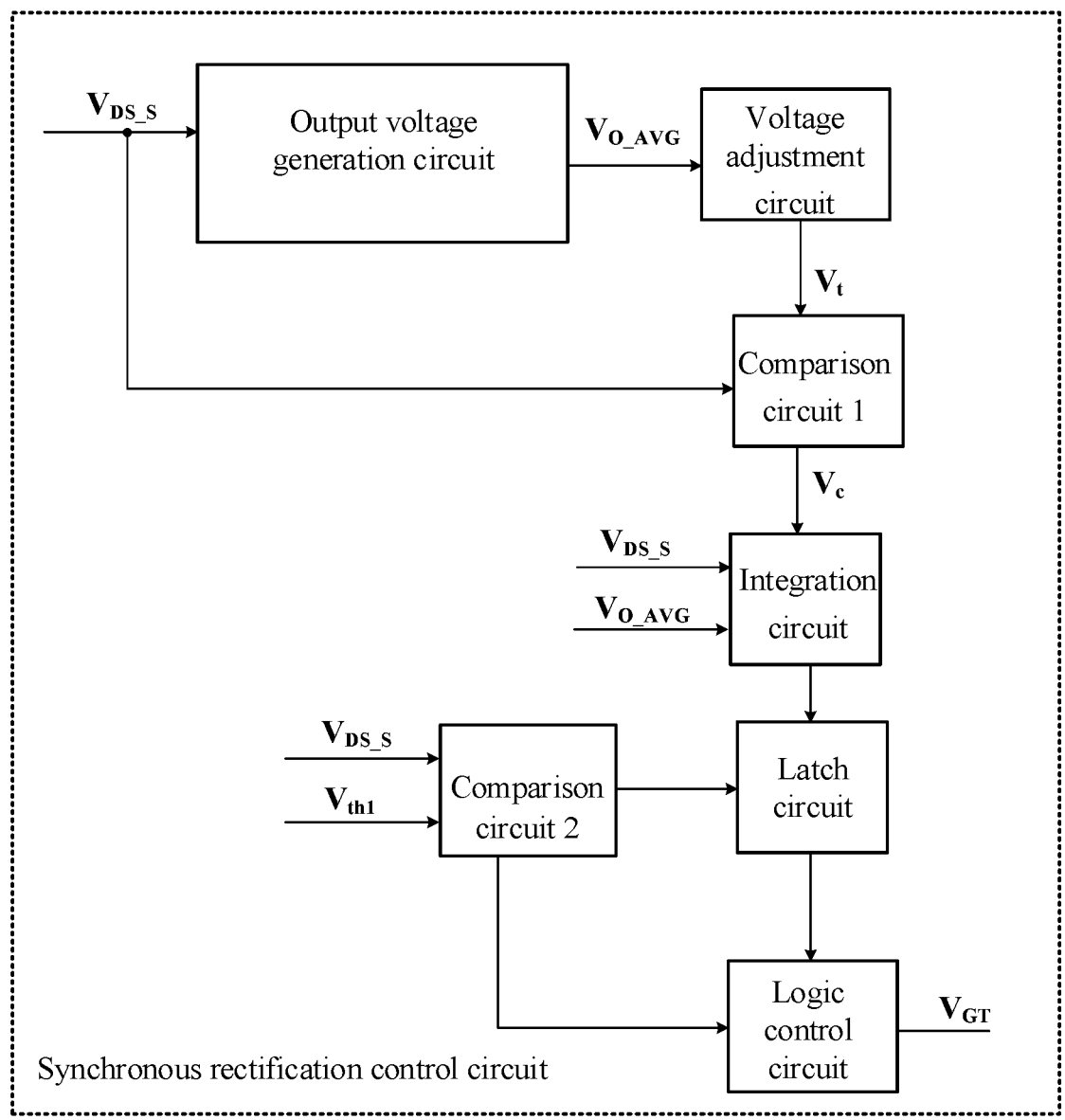
FIG. 6 is a block diagram of a synchronous rectification control circuit according to another embodiment of the present disclosure.

In another embodiment, the control method in the present disclosure may further include the following steps: Denoting a comparison result of the integral signal and the integral threshold as a first comparison signal. When the integral signal reaches the integral threshold, the first comparison signal is in a valid state. The first comparison signal in the valid state is latched to obtain a first latch result. Referring to FIG. 6, the first comparison signal is latched through a latch circuit to obtain the first latch result.

In an embodiment, the control method in the present disclosure may further include the following steps: Comparing the drain-source voltage of the synchronous rectifier with a first voltage threshold to obtain a second comparison signal. When the drain-source voltage of the synchronous rectifier decreases to the first voltage threshold, the second comparison signal is in the valid state. The first latch result is zeroed if the second comparison signal is not in the valid state within a preset duration after the first comparison signal is latched. The synchronous rectifier is turned on when the first latch result is non-zero and the second comparison signal is in the valid state. Still referring to FIG. 6, a second comparison circuit 2 is configured to compare the drain-source voltage of the synchronous rectifier with the first voltage threshold. A logic control circuit is configured to receive the first latch result and the second comparison signal. When the first latch result is non-zero and the second comparison signal is in the valid state, the logic control circuit outputs a signal $V_{GT}$ to control the synchronous rectifier to be turned on.

The present disclosure further provides a synchronous rectification control circuit, which is applied to a flyback SMPS. The flyback SMPS includes a primary-side main power transistor switch and a secondary-side synchronous rectifier. The control circuit includes an output voltage generation circuit, a voltage adjustment circuit, one or more comparison circuit, and an integration circuit. The structure and function of each circuit have been described above, and details are not described herein again.

Based on the foregoing circuit structures and control method, through the synchronous rectification control solution according to the embodiments of the present disclosure different values of the second voltage signal can be conveniently obtained, and can be switched based on the working status of the SMPS. In this way, the integral signal can be prevented from mistakenly reaching the integral threshold in any scenario in the SMPS circuit, and thusly the primary-side transistor switch and the secondary-side synchronous rectifier will not be simultaneously turned on.

In the embodiments of the present disclosure, the voltage adjustment circuit adjusts the first voltage signal, and the adjustment range to the first voltage signal may be zero. The first latch result may be zeroed if the second comparison signal is not in the valid state within the preset duration after the first comparison signal is latched. Thusly, the integral signal can also be prevented from mistakenly reaching the integral threshold, and a case in which the primary-side transistor switch and the secondary-side synchronous rectifier are simultaneously turned on can be avoided.

The foregoing embodiments do not constitute any limitation to the protection scope of the technical solution. Any modification, equivalent replacement, or improvement made without departing from the spirit and principle of the foregoing embodiments shall fall within the protection scope of the technical solution.

What is claimed is:

1. A synchronous rectification control method for controlling a secondary-side synchronous rectifier of a switched-mode power supply (SMPS), comprising the following steps:
   detecting a drain-source voltage of the synchronous rectifier to obtain a first voltage signal, wherein the first voltage signal represents an output voltage of the SNIPS;
   adjusting a voltage value of the first voltage signal to obtain a second voltage signal;
   comparing the drain-source voltage of the synchronous rectifier with the second voltage signal, and when the drain-source voltage of the synchronous rectifier is higher than the second voltage signal, integrating a difference between the drain-source voltage of the synchronous rectifier and the first voltage signal to obtain an integral signal; and when the drain-source voltage of the synchronous rectifier is lower than the second voltage signal, stopping the integration and zeroing the integral signal; and
   setting an integral threshold, wherein the synchronous rectifier is turned off when the integral signal does not reach the integral threshold.

2. The control method according to claim 1, wherein a value of the second voltage signal is set to enable the drain-source voltage of the synchronous rectifier to be lower than the second voltage signal within each resonant period of the drain-source voltage of the synchronous rectifier after the synchronous rectifier is turned off.

3. The control method according to claim 2, further comprising: setting at least one reference voltage signal, wherein
   if one reference voltage signal is set, a sum of the first voltage signal and the reference voltage signal is used as the second voltage signal; or
   if a plurality of reference voltage signals are set, the first voltage signal is added to each of the plurality of reference voltage signals to obtain a plurality of intermediate voltage signals, and a largest value among the plurality of intermediate voltage signals is used as the second voltage signal; or one of the plurality of intermediate voltage signals is output as the second voltage signal based on a working status of the SMPS.

4. The control method according to claim 1, wherein a comparison result of the integral signal and the integral threshold is labelled as a first comparison signal, and when the integral signal reaches the integral threshold, the first comparison signal is in a first valid state, and the first comparison signal in the first valid state is latched to obtain a first latch result.

5. The control method according to claim 4, wherein the drain-source voltage of the synchronous rectifier is compared with a first voltage threshold to obtain a second comparison signal, and when the drain-source voltage of the synchronous rectifier decreases to the first voltage threshold, the second comparison signal is in a second valid state; and the first latch result is zeroed if the second comparison signal is not in the second valid state within a preset duration after the first comparison signal is latched, wherein the synchronous rectifier is turned on when the first latch result is non-zero and the second comparison signal is in the second valid state.

6. The control method according to claim 1, wherein the step of detecting the drain-source voltage of the synchronous rectifier to obtain the first voltage signal specifically comprises:
sampling the drain-source voltage of the synchronous rectifier to obtain a sampled drain-source voltage signal, and filtering the sampled drain-source voltage signal to obtain an average drain-source voltage of the synchronous rectifier; wherein
the average drain-source voltage of the synchronous rectifier is used as the first voltage signal.

7. A synchronous rectification control circuit for a flyback switched-mode power supply (SMPS), wherein the flyback SMPS comprises a primary-side main power transistor switch and a secondary-side synchronous rectifier, and the control circuit comprises:
an output voltage generation circuit, configured to detect a drain-source voltage of the synchronous rectifier to obtain a first voltage signal, wherein the first voltage signal represents an output voltage of the SMPS;
a voltage adjustment circuit, configured to receive the first voltage signal and adjust a voltage value of the first voltage signal to obtain a second voltage signal;
a first comparison circuit, configured to compare the drain-source voltage of the synchronous rectifier with the second voltage signal to obtain a first comparison signal; and
an integration circuit, configured to receive the drain-source voltage of the synchronous rectifier and the first voltage signal, and determine whether to integrate a difference between the drain-source voltage of the synchronous rectifier and the first voltage signal based on the first comparison signal.

8. The control circuit according to claim 7, wherein a value of the second voltage signal is set to enable the drain-source voltage of the synchronous rectifier to be lower than the second voltage signal within each resonant period of the drain-source voltage of the synchronous rectifier after the synchronous rectifier is turned off.

9. The control circuit according to claim 7, wherein when the drain-source voltage of the synchronous rectifier is higher than the second voltage signal, the integration circuit integrates the difference between the drain-source voltage of the synchronous rectifier and the first voltage signal to obtain an integral signal; and when the drain-source voltage of the synchronous rectifier is lower than the second voltage signal, the integration circuit stops the integration and zeros the integral signal.

10. The control circuit according to claim 9, wherein the control circuit further comprises a logic control circuit, configured to:
receive the integral signal output by the integration circuit, set an integral threshold, and when the integral signal does not reach the integral threshold, control the synchronous rectifier to be turned off.

11. The control circuit according to claim 10, wherein when the integral signal reaches the integral threshold, the first comparison signal is in a first valid state, and the first comparison signal in the first valid state is latched to obtain a first latch result.

12. The control circuit according to claim 11, comprising a second comparison circuit, wherein
the second comparison circuit compares the drain-source voltage of the synchronous rectifier with a first voltage threshold to obtain a second comparison signal, and when the drain-source voltage of the synchronous rectifier decreases to the first voltage threshold, the second comparison signal is in a second valid state; and
the logic control circuit zeros the first latch result if the second comparison signal is not in the second valid state within a preset duration after the first comparison signal is latched, wherein the synchronous rectifier is turned on when the first latch result is non-zero and the second comparison signal is in the second valid state.

13. The control circuit according to claim 7, wherein the output voltage generation circuit comprises a sampling circuit and a filter circuit, wherein
the sampling circuit samples the drain-source voltage of the synchronous rectifier to obtain a sampled drain-source voltage signal; and
the filter circuit filters the sampled drain-source voltage signal to obtain an average drain-source voltage of the synchronous rectifier, wherein the average drain-source voltage of the synchronous rectifier is used as the first voltage signal.

14. The control circuit according to claim 7, wherein the voltage adjustment circuit comprises an addition circuit, one reference voltage signal is set, and the addition circuit adds the first voltage signal and the reference voltage signal together and uses a sum as the second voltage signal.

15. The control circuit according to claim 7, wherein the voltage adjustment circuit comprises an addition circuit and a signal selection circuit, wherein
a plurality of reference voltage signals are set, and the addition circuit adds the first voltage signal to each of the plurality of reference voltage signals to obtain a plurality of intermediate voltage signals; and
the signal selection circuit selects a largest value among the plurality of intermediate voltage signals as the second voltage signal; or outputs one of the plurality of intermediate voltage signals as the second voltage signal based on a working status of the SMPS.

16. The control circuit according to claim 7, wherein an adjustment range to the voltage value of the first voltage signal is zero.

17. A flyback switched-mode power supply (SMPS) comprising a primary-side main power transistor switch and a secondary-side synchronous rectifier, further comprising the synchronous rectification control circuit according to claim 7, wherein the synchronous rectification control circuit is configured to control a working status of the secondary-side synchronous rectifier.

* * * * *